(12) United States Patent
Gabrys et al.

(10) Patent No.: US 6,727,616 B1
(45) Date of Patent: Apr. 27, 2004

(54) FLYWHEEL ENERGY STORAGE SYSTEM WITH QUILL STABILIZER

(76) Inventors: Christopher W. Gabrys, 900 S. Meadows Pkwy. #3513, Reno, NV (US) 89511; David R. Campbell, 6850 Sharlands Ave. #W1137, Reno, NV (US) 89523

( * ) Notice: Subject to any disclaimer, the term of this patent is extended or adjusted under 35 U.S.C. 154(b) by 45 days.

(21) Appl. No.: 10/005,825

(22) Filed: Nov. 8, 2001

Related U.S. Application Data

(60) Provisional application No. 60/246,962, filed on Nov. 8, 2000.

(51) Int. Cl.[7] ............................................... H02K 7/09
(52) U.S. Cl. ...................................... 310/90.5; 310/90
(58) Field of Search ......................... 310/90.5, 74, 90

(56) References Cited

U.S. PATENT DOCUMENTS

| | | | | |
|---|---|---|---|---|
| 2,658,805 A | * | 11/1953 | Mendelsohn | 310/90.5 |
| 3,216,655 A | * | 11/1965 | Wind et al. | 494/61 |
| 3,749,528 A | * | 7/1973 | Rousseau et al. | 417/423.4 |
| 3,780,937 A | * | 12/1973 | Tahara et al. | 494/47 |
| 3,909,082 A | * | 9/1975 | Ishikawa et al. | 310/90.5 |
| 4,223,240 A | | 9/1980 | Theyse | 310/74 |
| 4,334,718 A | * | 6/1982 | Hirt et al. | 310/90.5 |
| 4,768,921 A | * | 9/1988 | Shinjiro et al. | 415/90 |
| 5,065,060 A | | 11/1991 | Takahashi et al. | 310/74 |
| 5,314,868 A | * | 5/1994 | Takahata et al. | 505/166 |
| 5,446,018 A | * | 8/1995 | Takahata et al. | 310/90.5 |
| 5,838,082 A | * | 11/1998 | Ito et al. | 310/90.5 |
| 5,880,554 A | | 3/1999 | Liu | 313/309 |
| 5,905,321 A | | 5/1999 | Clifton et al. | 310/178 |
| 5,945,754 A | | 8/1999 | Fulwood et al. | 310/74 |
| 6,172,435 B1 | | 1/2001 | Tanaka | 310/74 |
| 6,194,801 B1 | * | 2/2001 | Goransson | 310/90.5 |
| 6,262,505 B1 | * | 7/2001 | Hockney et al. | 310/90.5 |
| 6,424,067 B1 | * | 7/2002 | Samways | 310/90.5 |

* cited by examiner

*Primary Examiner*—Dang Le
(74) *Attorney, Agent, or Firm*—J. Michael Neary

(57) ABSTRACT

A flywheel energy storage system includes an energy storage flywheel supported for rotation about a substantially vertical axis on a combination bearing system comprised of a mechanical and a magnetic bearing. A motor and generator accelerates and decelerates the flywheel for storing and retrieving energy. The mechanical bearing is located at one axial end of the flywheel and provides axial downward force to the flywheel and is connected to the mechanical rolling element bearing using a low radial stiffness connecting element. The magnetic bearing is located at the axial end of the flywheel opposite the end with the mechanical bearing and provides axial upward force to support the weight of the flywheel, and also provides passive magnetic radial centering force to the flywheel.

20 Claims, 6 Drawing Sheets

FLYWHEEL ENERGY STORAGE SYSTEM WITH QUILL STABILIZER

This is related to U.S. Provisional Application No. 60/246,962 filed on Nov. 8, 2000. This invention pertains to flywheel energy storage systems and more particularly to a flywheel system with a bearing configuration that combines an arrangement of magnetic and mechanical bearings for smooth operation, long life, reliable operation at low cost. The invention also has significantly improved handling durability over previous combination magnetic and mechanical flywheel supports.

BACKGROUND OF THE INVENTION

Flywheels have emerged as a very attractive energy storage technology for electrical applications, such as uninterruptible power supplies, utility load leveling systems, alternative energy generation, satellites and electric vehicles. Flywheel systems convert back and forth between the rotational energy of a spinning flywheel and electrical energy. A flywheel energy storage system includes a flywheel, a motor and generator, a bearing system and a vacuum enclosure. The rotating flywheel stores the energy mechanically; the motor and generator converts between electrical and mechanical, while the bearing system physically supports the rotating flywheel. High-speed flywheels are normally contained in a vacuum or low-pressure enclosure to minimize aerodynamic losses that would occur from atmospheric operation.

Some of the benefits of flywheel energy storage systems over conventional batteries are longer life and higher reliability. A key component to achieving long life with flywheel energy storage systems is the bearing system. Flywheels have been supported by numerous configurations of bearings that have included magnetic, mechanical and fluid type. Not only must the bearing system be capable of long life operation, but it must also allow smooth operation, have low friction and in many cases be very low in cost.

SUMMARY OF THE INVENTION

Accordingly, the invention is a flywheel energy storage system with an arrangement of magnetic and mechanical bearings that provides passive, reliable, long life operation with very low cost. The flywheel system is comprised of a flywheel inside an enclosed low-pressure chamber for reduction of aerodynamic losses. An attached motor/generator accelerates and decelerates the flywheel for storing and retrieving energy. The flywheel is supported for rotation about a vertical axis on the combination bearing system. At one axial end of the flywheel is a magnetic bearing that provides both axial and radial centering support. The passive radial magnetic bearing carries the majority of the flywheel's weight and also provides low stiffness radial support at that axial end. The opposite axial end of the flywheel is supported on a mechanical rolling element bearing, such as a ball bearing set. The rolling element bearing stabilizes the axial direction support of the flywheel and accomplishes this with a well-established and long life type of mechanical bearing. It also stabilizes the tilting of the flywheel by providing some radial support.

Although rolling element bearings are more costly than pivot or pin type bearings employed in previous systems, the life and reliability of flywheel energy storage systems with an arrangement of magnetic and mechanical bearings in accordance with the invention is improved. The flywheel is connected to the rolling element bearing with a connecting element that imparts a low radial stiffness. In one embodiment of the invention, the connecting element is a quill shaft. Another embodiment uses a low stiffness radial spring between the flywheel and the rolling element bearing. The benefit of the low radial stiffness from both the passive radial magnetic bearing and the mechanical bearing support is that the flywheel can operate above its rigid body critical speeds. The flywheel quickly accelerates to supercritical operation where the flywheel spins about its mass center and bearing loads and vibrations are greatly reduced while mechanical bearing life is increased. Compared with rigidly supported flywheel systems, the invention can operate at high speeds and have longer life. Because the axial stabilization for the flywheel support is imparted from a mechanical bearing located at a only single axial end of the flywheel, Poisson Ratio or thermal changes in the flywheel length do not result in excessive mechanical bearing loads. The magnetic bearing end of the flywheel simply experiences a slight change in the relative positions between the flywheel and stationary portions. The flywheel bearing arrangement of the invention provides a passive, low cost support for high-speed operation. The magnetic bearing carrying the majority of the flywheel weight significantly extends the life of the mechanical bearing. Compared with fluid type bearings, the invention also exhibits minimal outgassing.

In another embodiment of the invention, passive radial magnetic bearings are employed at both axial ends of the flywheel. In this configuration, the magnetic bearings cooperate to provide unstable axial support but stable radial and stable tilting support. The radial centering stiffness of a single magnetic bearing at one axial end of the flywheel overcomes the unstable tilting moment of the other magnetic bearing at the other axial end. A rolling element mechanical bearing with a low radial stiffness connecting element provides axial stabilization by providing some axial support. With the use of both magnetic bearings, the mechanical bearing need not carry radial loads and the connecting element is preferably made to impart a very low radial stiffness, less than the radial stiffness of the adjacent passive radial magnetic bearing. The life of the rolling element bearing is even further increased.

In several configurations of the invention a shipping and handling mechanism is provided to make the flywheel system more durable and robust. Although the rolling element bearing provides axial support for the flywheel, during transportation of the system, the bearing or quill shaft can become easily damaged especially if the flywheel is of significant weight. The mechanical bearing therefore only provides support in one axial direction. For example, the connection between the flywheel and the mechanical bearing has a stop to prevent motion of the flywheel axially only one way. This allows the flywheel to be stably supported with the magnetic bearing or bearings, and allows the flywheel to slide vertically in the other direction. When the flywheel system is designed such that the magnetic bearings lift more than the weight of the flywheel and the mechanical bearing exerts a downward force in operation, the flywheel can eliminate damage from impacts during handling. When the flywheel system is set down, instead of the large mass of the flywheel impact loading the delicate mechanical bearing, the flywheel simply slides down axial until contacting a stop. The magnetic bearing subsequently pulls the flywheel back upward to engage the mechanical bearing for operation.

In other embodiments of the invention, mechanical rolling element bearings are described for long life operation. Multiple preloaded angular contact bearings as well as parallel bearings can be used to increase life through reduction of carried load. A series bearing arrangement can also be used to increase life by reducing the number of cycles and by limiting the operating speed. Such an arrangement can be beneficially used with dry lubricated bearing sets that are very low outgassing but are speed limited.

DESCRIPTION OF THE PREFERRED EMBODIMENT

Figure 1:
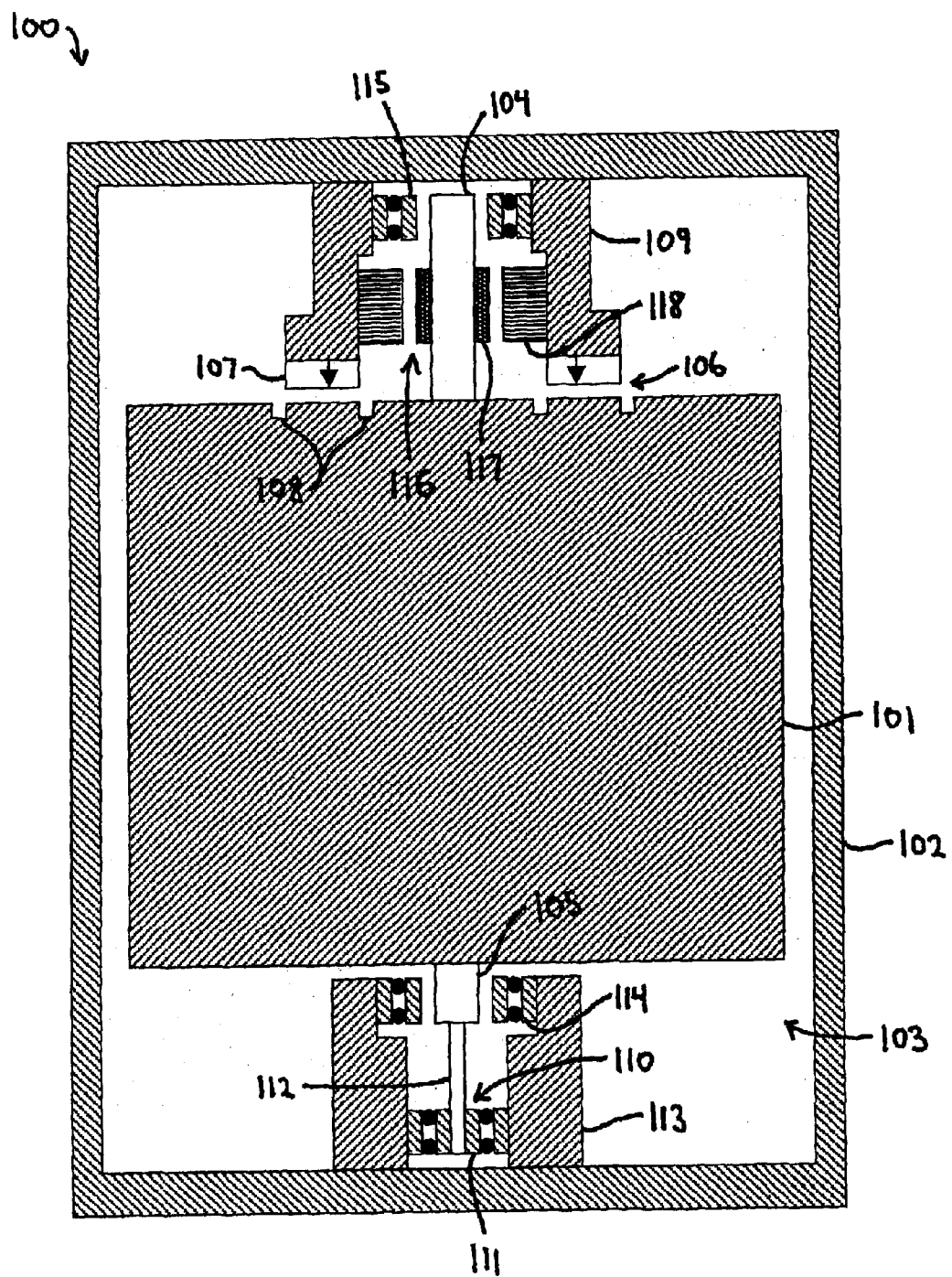
FIG. 1 is a schematic drawing of a flywheel energy storage system in accordance with the invention.

Turning now to the drawings, wherein like reference characters designate identical or corresponding parts, and more particularly to FIG. 1 thereof, a flywheel energy storage system in accordance with this invention is shown having a flywheel 101 that is supported to rotate about a substantially vertical axis in a chamber 103 within a container 102. The chamber 103 is preferably maintained at a vacuum for reduction of aerodynamic losses that would otherwise occur. The flywheel 101 could be constructed of metal or composite materials and can take many configurations that are well known in the art. However, the flywheel is preferably constructed of solid steel for low cost, simplicity and reliability, all fitting with the objectives of the invention. By being solid as shown, the flywheel hoop direction stresses in the center are at least 50% lower than they would be with a center hole, thus allowing the flywheel to operate at more than 40% higher speed than with a central hole. Steel flywheels also have very low outgassing that makes the maintenance of vacuum for many years much easier.

The flywheel 101 has upper and lower shafts 104 and 105 and is supported for rotation on a combination of a magnetic bearing 106 and a mechanical rolling element bearing 110. On the top end of the flywheel 101, the magnetic bearing 106 is a passive radial magnetic bearing and axial support bearing for the majority of the weight of the flywheel. Many types of passive radial and axial magnetic bearings exist and could be used with the invention. The rolling element mechanical bearing 110 is at the bottom and opposing end of the flywheel 101. This bearing 110 provides axial stabilization and also provides radial centering support for the bottom end of the flywheel 101. The radial centering support also overcomes any unstable tilting moment generated by the upper magnetic bearing 106.

The flywheel shaft 105 is connected to the rolling element bearing 110 with a quill shaft 112 that imparts a low radial stiffness. The low stiffness, similar to the magnetic bearing 106, allows the flywheel to spin through its rigid body criticals at low speed and hence operate supercritically. The flywheel can then spin smoothly about its mass center with reduced bearing loads for longer life. The radial stiffness imparted through the quill shaft 112 depends on the size of the flywheel system 100, however for many systems this stiffness is preferably less than 7000 lbs/in. The rolling element bearing 110 is preferably a bearing set 111 such as a ball bearing set. The bearing set 111 is mounted to a lower bearing support structure 113. A damper, not shown can be included in the mounting or a quill shaft having internal damping could be used, if damping is desired for operation. The quill shaft 112 is preferably constructed from steel because of its high strength, however numerous other materials could alternatively be used as long as they imparted the desired low radial stiffness and were durable enough for operation.

The magnetic bearing 106 preferably carries more than 90% of the weight of the flywheel but less than 110% such that the axial load that the mechanical bearing must support is made small. The rolling element bearing 110 can still function under more load, but the life of the bearing set 111 would be significantly reduced. The life is generally a cubic function of the applied load. As shown, the bearing set 111 is a multiple or tandem preloaded angular contact bearing pair. Use of ceramic hybrid bearings can allow higher speeds and longer life. Compared with prior flywheel systems that have used pin or pivot type bearings for stabilizers, the use of a rolling element bearing is expected to provide longer and more reliable life. The ball bearing or rolling element bearing is a conventional and well-developed reliable bearing. The rotary motion is facilitated by rolling instead of frictional sliding on a pivot. More load can be carried and bearing life is increased compared to such a pivot or pin-type bearing. Also, compared with flywheel systems employing pressurized oil bearings, the bearing system has reduced outgassing and no need for an oil pump, which can fail. The magnetic bearing 106 which carries most of the flywheel weight and the flexible quill shaft both cooperate to increase the life of the rolling element bearing 110.

The flywheel 101 is rigidly supported in the vertical direction only at one end. Therefore, changes in the axial length of the flywheel 101 such as from thermal expansion or Poissions ratio contraction when spinning do not result in excessive axial loads on the mechanical bearing 111. Instead, the air gap in the passive radial magnetic bearing 106 changes. The magnetic bearing 106 is preferably designed to have a shallow force versus gap curve to minimize changes in the support force. The magnetic bearing 106 shown uses a stationary ring magnet 107 attached to an upper support structure 109. Passive radial centering force is generated by interaction of the magnet with grooves 108 in the upper face of the flywheel 101 that define an axial pole there between. The flywheel 101 tends to radially align such that the grooves 108 are centered with the ring magnet 107. Alternatively, an annular land or raised band could be used that provides edges with which the magnetic field could interact for centering. As mentioned previously, any type of passive radial magnetic bearing could be used.

Although the flywheel system 100 is shown with the magnetic bearing 106 located on the top end of the flywheel 101 and the mechanical bearing at the bottom end, the positions could be reversed.

To limit excessive displacements of the flywheel 101 during transition through critical speeds, or because of impact loads encountered during shipping and handling, upper and lower auxiliary bearings 115 and 114 are included. The auxiliary bearings 114, 115 can be rolling element bearings or even bushings for lower cost. The auxiliary bearings 114, 115 are connected to the lower and upper stationary supports 113, 109.

To accelerate and decelerate the flywheel 101 for storing and retrieving energy, the flywheel has an attached motor/generator 116. The motor/generator 116 preferably uses permanent magnets 117 attached to the upper shaft 104; the magnets cooperate with a surrounding stator 118 containing electromagnetic coils, not shown. Many other types of motor/generators could be used with the invention, although brushless types are preferred for long life and low losses. The motor/generator 116 could also be comprised of a separate motor and generator.

The embodiment shown in the previous configuration uses the rolling element bearing 110 to carry radial as well as axial load. The radial load arises from both radial loading at the bottom end of the flywheel and also from the tilting tendency from the magnetic bearing at the opposing end, which is reacted by the mechanical bearing 110. To minimize the unstable tilt, moment generated by the magnetic bearing, the magnetic bearing could be designed with a radiused or stepped axial surface, as shown in U.S. Provisional Application No. 60/266,175, the disclosure of which is incorporated herein by reference.

Figure 2:
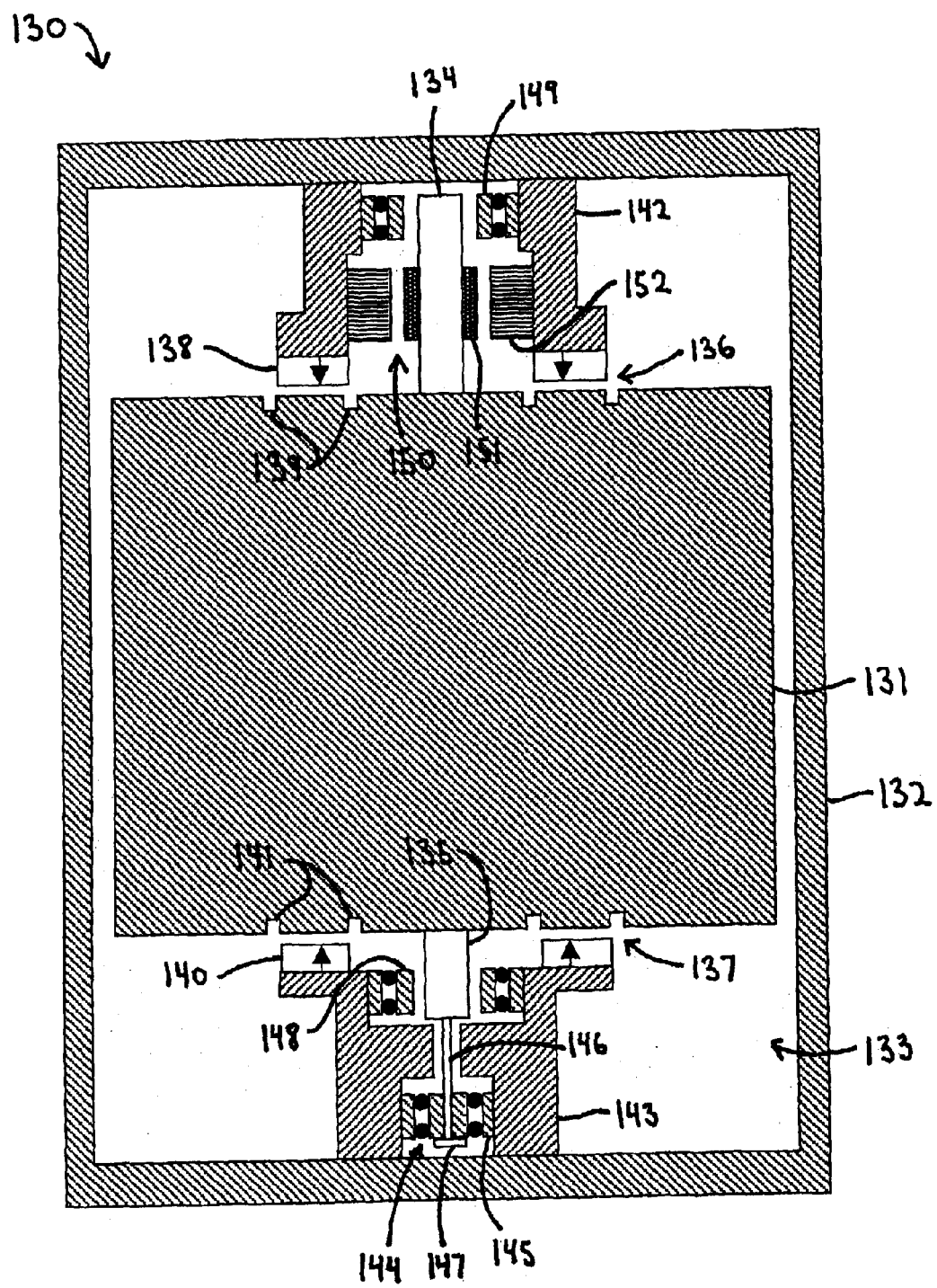
FIG. 2 is a schematic drawing of an alternate configuration flywheel energy storage system in accordance with the invention.

The radial load to the mechanical bearing induced by the unstable tilt moment can also be further reduced by employing two passive radial magnetic bearings. This aspect of the invention is illustrated in FIG. 2 in a flywheel system 130 comprised of a flywheel supported for rotation about a vertical axis inside an evacuated chamber 133 within a container 132. The flywheel 131 is supported by upper and lower passive radial magnetic bearings 136 and 137. In this configuration, the passive radial bearings 136, 137 provide both axial support and radial support at the upper and lower ends of the flywheel 131. They also cooperate to provide stable tilting support by the radial centering force of one bearing overcoming the unstable tilting moment of the other bearing. The flywheel 131 is stably levitated in all directions except the axial direction, and a mechanical rolling element bearing 144 is used to provide axial stabilization. The lower flywheel shaft 135 is connected to the rolling element bearing 144 with a flexible quill shaft 146. The rolling element bearing 144 is preferably a bearing set 145. Because the lower radial magnetic bearing 137 provides tilt stabilization and radial centering support, the mechanical bearing 144 need not carry radial loading. The quill shaft 146 is preferably made very flexible such that it imparts a radial stiffness that is less than the radial stiffness of the lower magnetic bearing 137. Radial loading to the mechanical bearing 144 is thus minimized and its life is increased.

The upper and lower magnetic bearings 136, 137 use ring magnets 138, 140, attached to upper and lower stator structures 142, 143, that cooperate with grooves 139, 141 on the faces of the flywheel 131. Other types of passive radial magnetic bearings could also be employed. Designs with spherical end faces or ones with permanent magnets on both the flywheel and stator portions can reduce the unstable tilting moments generated. The result can be a high radial stiffness and allowable system tilt angle for a given axial length between the magnetic bearings.

Another aspect of the invention that affords increased durability of the flywheel system 130 is illustrated in this configuration illustrated in FIG. 2. Because the mechanical rolling element bearing 144 is susceptible to damage from impact and excessive loading, especially during shipping handling and installation, a method and apparatus for preventing such damage is illustrated. The connection between the quill shaft 146 and the rolling element bearing set 145 includes a sliding fit of the quill shaft 146 in the inner race of the bearing 144, and an axial stop 147 at the end of the quill shaft 146. The stop 147 prevents upward motion of the flywheel 131 from the position illustrated in FIG. 2, but it does not prevent downward motion from that position. The magnetic bearings 136, 137 provide an upward axial force greater than the weight of the flywheel 131. When the flywheel system 130 is impacted vertically such as by setting the system down on a hard surface, the flywheel simply slides downward and does not impact load the mechanical bearing set 145. A sturdy mechanical stop, such as the lower shaft 135 contacting the lower stator structure 143, can safely limit the axial motion. Once the system 130 is settled, the force from the magnetic bearings 136, 137 lifts the flywheel 131 back such that the stop 147 engages the rolling element bearing set 145. A spring, not shown, could also be included between the stop 147 and the bearing set 145 to reduce any impact forces generated during re-engagement.

This downward sliding ability for preventing mechanical bearing damage could also be applied to prior art flywheel systems that used pivot type bearings for axial stabilization. It can also be applied to the system of FIG. 1, using only a single magnetic bearing and is especially useful with large mass flywheels. The flywheel system can also be constructed with the mechanical bearing located at the top, in which case the stop would be similarly located on the quill shaft to limit the upward motion of the flywheel.

To prevent excessive radial motion of the flywheel 131, upper and lower auxiliary bearings or stops 149 and 148 are attached to the upper and lower stator structures 142, 143 and they would contact upper and lower shafts 134, 135. To store and retrieve energy, a motor/generator 150 is provided with rotor magnets 151 attached to the flywheel shaft 134. A surrounding stator 152 provides energy conversion. Axial gap or certain air core motor/generator designs with rotating back irons could alternatively be used to limit or eliminate the generation of unstable radial forces. Such forces tend to reduce the radial load capability of the magnetic bearings and the allowable system tilt.

Figure 3:
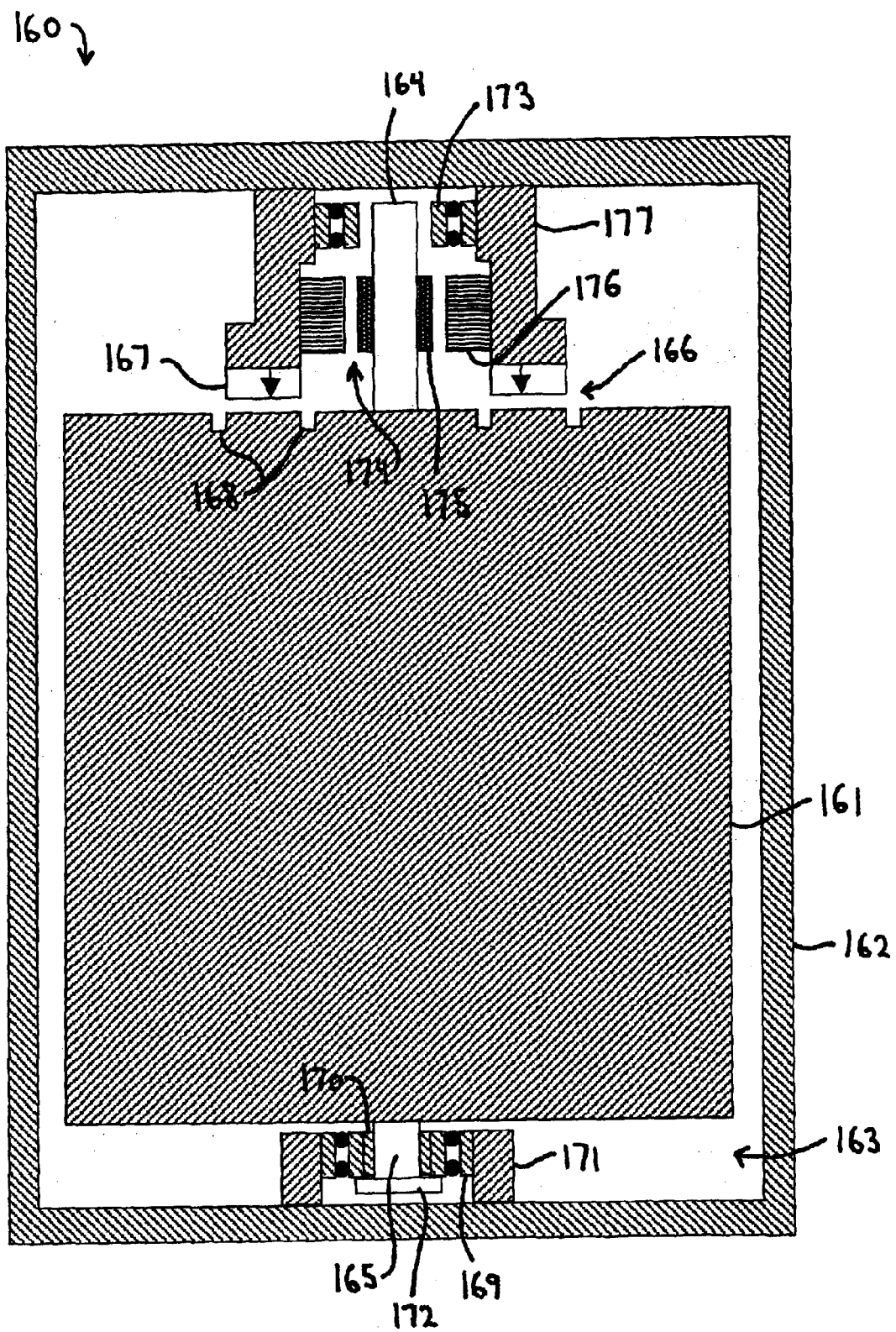
FIG. 3 is a schematic drawing of a second alternate configuration flywheel energy storage system in accordance with the invention.

As shown in FIG. 3, a second alternative configuration flywheel system 160, in accordance with the invention, includes a flywheel 161 that is supported for rotation about a vertical axis within an evacuated chamber 163 inside a container 162. For very low cost and somewhat lower performance flywheel systems, the vacuum inside the chamber 163 can be replaced with a low friction environment such as a small molecule gas like helium. This results in higher drag than in a vacuum or low pressure gas environment, but if the tip speed of the flywheel 161 is low enough, the losses may be acceptable.

The flywheel 161 is supported for rotation by a passive radial magnetic bearing 166 and a mechanical rolling element bearing 169 at the opposite end. Instead of using a quill shaft to impart a low radial stiffness at the end with the mechanical bearing 169, low radial stiffness is imparted by use of a radial spring 170, preferably located between the flywheel shaft 165 and the rolling element bearing 169 so that once through the rigid body critical speeds, the spring does not cycle. The spring could be placed between the stator structure 171 and rolling element bearing 169, however in some flywheel configurations this could shorten the life of the spring from cycling and would be less preferable in those configurations. The radial spring can be made from elastomers or is more preferably constructed from metal for longer life, better thermal conductivity and low outgassing. Tolerance rings, leaf springs or metal mesh could be used. Woven metal mesh springs can be useful in providing damping. A separate damper could also be employed.

The lower flywheel shaft 165 has a sliding fit in the tolerance ring 170, allowing downward displacement of the shaft 165 and the flywheel 161. An axial end stop 172 on the flywheel shaft 165 limits upward displacement of the shaft 165, preventing damage to the magnetic bearing 166. The magnetic bearing 166 is comprised of a stationary ring magnet 167 that cooperates with grooves 168 on the top end of the flywheel 161. The magnetic bearing 166 could include a yoke return path for the flux from the magnet 167 between the top side of the magnet 167 and flywheel 161. This would increase the axial and radial centering forces, however it would also increase the slope of the axial force to air gap distance between the magnet 167 and flywheel 161. Thus a magnetic bearing 166 that could lift the flywheel 101 from being displaced downward would exert more axial force on the mechanical bearing 169 during normal operation. Changes in the length of the flywheel 161 would also result in greater changes in the load to the mechanical bearing 169. Use of a taller magnet 167 can counteract the changes in force to air gap distance. An upper auxiliary bearing 173 is attached to the upper stator structure 177 in a position to contact the upper shaft 164 to prevent excessive radial displacement of the flywheel 161. A motor/generator 174 provides energy conversion. The motor/generator 174 is shown with rotor magnets 175 attached to the upper shaft 164 and surrounded by the motor/generator stator 176.

Figure 4:
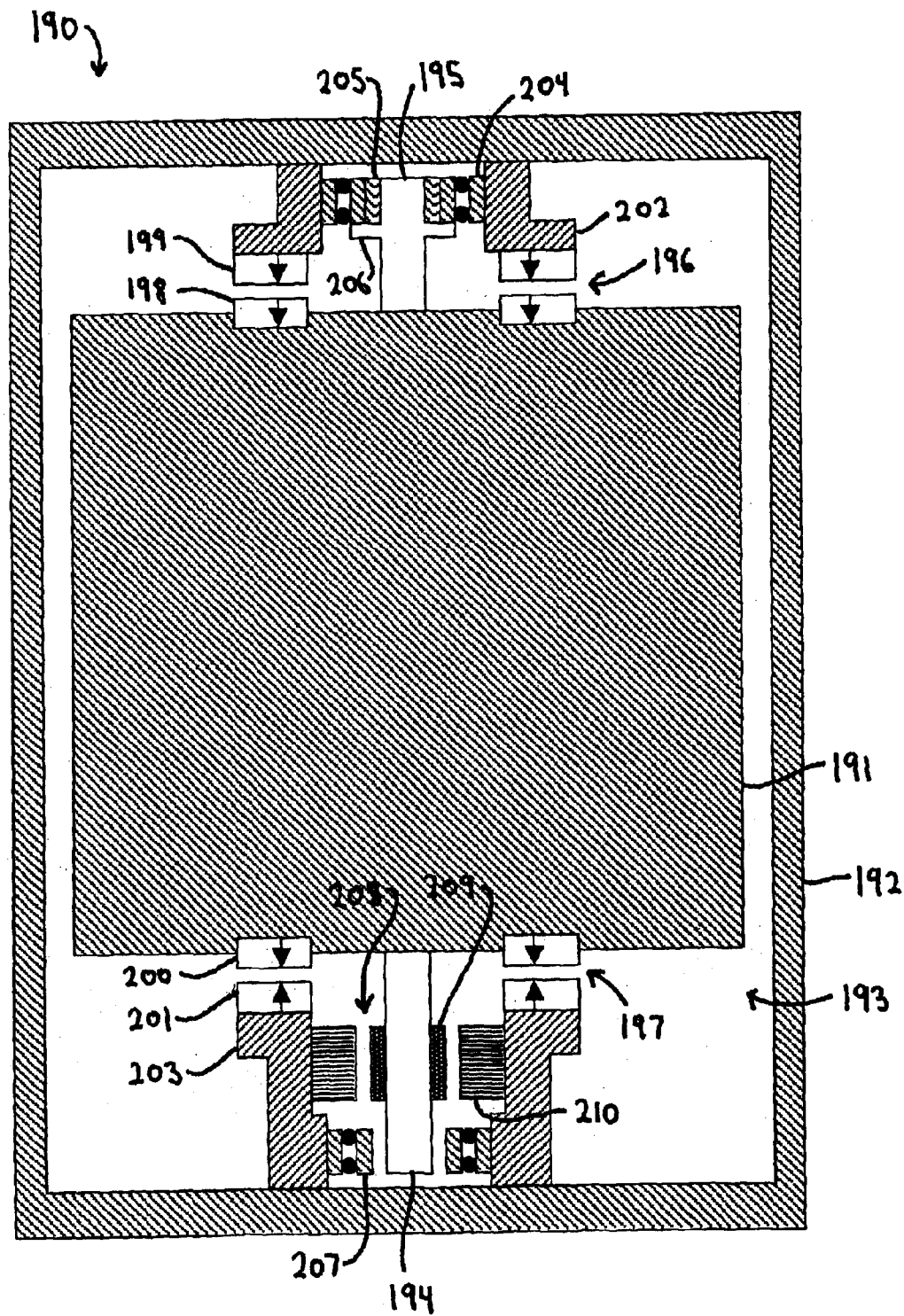
FIG. 4 is a schematic drawing of a third alternate configuration flywheel energy storage system in accordance with the invention.

A third alternate configuration of a flywheel energy storage system 190, shown in FIG. 4, includes a flywheel 191 that is supported to rotate about a vertical axis inside an evacuated chamber 193 inside a container 192. The flywheel is supported by upper and lower passive radial magnetic bearings 196 and 197. As shown, the upper magnetic bearing 196 is attractive and the lower magnetic bearing 197 is repulsive, and together the magnetic bearings 196, 197 have greater load carrying capacity than the weight of the flywheel 191. A mechanical rolling element bearing 204 provides axial stabilization through connection to the upper flywheel shaft 195 using a low stiffness radial spring 205. In this configuration, the stiffness of the radial spring 205 can be made very low because the upper radial magnetic bearing 196 provides radial centering force. The mechanical bearing 204 could also be attached to the upper shaft 195 and an axial stop could be attached to the upper stator structure 202 to limit axial displacement. The upper shaft 195 has a stop 206 that limits upward displacement of the flywheel 191, and a lower stop at the end of the shaft 194 could also be used. During a vertical impact, the flywheel can slide downward to prevent damage to the rolling element bearing 204. Although configurations of the invention shown have used stops to prevent axial displacement, a tapered shaft to bearing connection could alternatively be used instead.

The magnetic bearings 196, 197 are comprised of stationary ring magnets 199 and 201 that cooperate with rotating ring magnets 198 and 200 to provide passive radial centering and axial forces. The rotating ring magnets 198, 200 can be made from are pieces to limit hoop direction stresses if required. To prevent excessive radial displacements, a lower auxiliary bearing 207 is attached to the lower stator structure. A spring damper, not shown, can be used with the auxiliary bearing 207 to reduce radial impact loads. The flywheel is accelerated and decelerated using a motor/generator 208 comprised of rotor magnets 209 attached to the lower shaft 194 and surrounded by the motor/generator stator 210.

In all configurations of the invention, rolling element bearings are used to provide stabilization. The mechanical rolling element bearings are preferably ball or roller bearings. These are conventional mechanical elements that have been well refined and whose characteristics are well understood. Ball and roller bearing sets have individual rolling elements, which share the load, thus significantly increasing life. They also roll instead of slide and can be sealed to confine lubricant within the races. Typically ball bearings are used in high speed rotating equipment and for support of axial loads; angular contact bearings are preferred over deep groove bearings. Ceramic hybrid bearings are also preferable because they have lives of 2–5 times longer than conventional steel bearing sets and can operate at higher speed due to the lower density of the balls. Such bearings are available from The Barden Corporation.

The preload on the bearings greatly affects the life of the bearings. It is preferable to minimize the load on the bearings, however some preload is required. The stabilizer bearings can use individual bearing sets or preloaded tandem pairs. This insures that adequate preload is maintained regardless of the axial load from the flywheel. A typical bearing design methodology is to start the bearing selection for the largest bearing sets that can operate at the flywheel speed. Ceramic bearings can operate approximately 1.4 times faster than steel balls however the maximum allowable bearing speed must be derated approximately in half for use of a heavy loading and in half again for use of dry lubricant instead of oils or greases. Dry lubricant has the advantage of low outgassing but it has lower speed capability. The speed capability of bearings is typically a function of the temperature that is allowable. Many types of lubrication can be used and are well known in the art.

The life of the bearings is in most cases a fatigue issue, which translates to the load applied and the number of cycles. The axial load on the bearings in operation is converted to radial equivalent load by using tables. The equivalent load, P, is input into the expression:

$$L=(C/P)^3 * (10^6 \text{ revolution})$$

where C is the basic dynamic load rating for an individual bearing and L is the minimum life. Because the life is a cubic function of load applied to the bearings, reduction of the axial loads by the magnetic bearings and elimination or greatly reduced magnitude of radial loads by the flexible quill shaft or soft radial springs drastically increases the life of the flywheel system. If the bearings loads are reduced by a factor of 2, the system life is increased 8 times. Likewise, if the bearing loads are reduced by a factor of 4, the system life is increased 64 times. New advancements in dry lubricated ceramic hybrid bearings also promise to further increase the bearing life.

Figure 5:
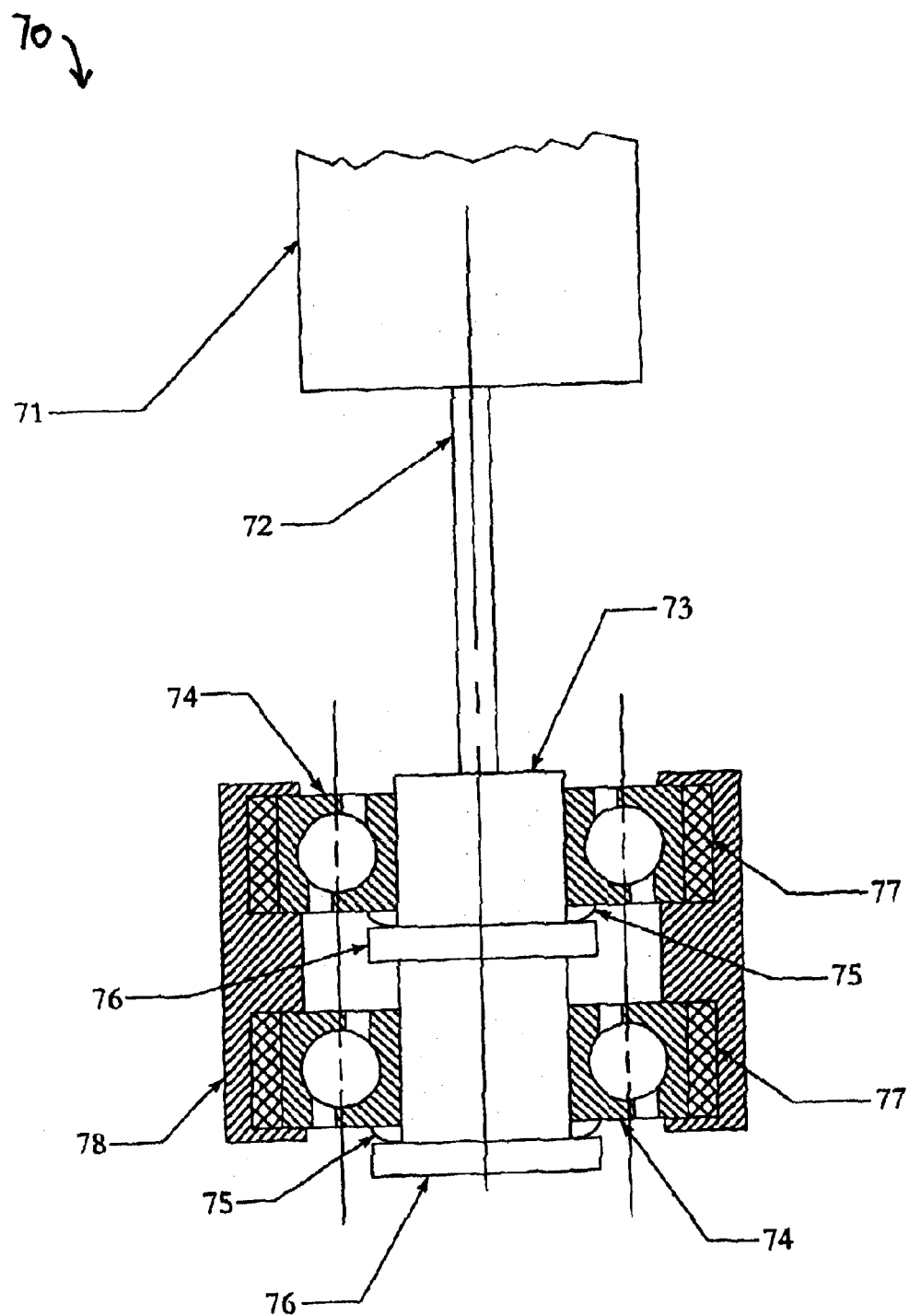
FIG. 5 is a schematic drawing of a parallel rolling element bearing for use with the invention.

To insure proper preloading of ball bearings, multiple preloaded angular contact bearing sets can be used. A single unpreloaded bearing set could be used if the magnetic bearings maintained the proper preload. An alternate method for extending bearing life is by paralleling individual bearings for sharing of the load, as shown in FIG. 5. The mechanical bearing system 70 is comprised of a flywheel shaft 71 with an attached quill shaft 72. On the end of the quill shaft 72 is a cylinder 73 with axial stops 76. The stops transfer axial load to the upper and lower ball bearing sets 74 through the use of axial springs 75. The springs are preferably Belleville springs, however other types may be used. The bearings 74 are mounted to the stator housing 78 and dampers or tolerance rings 77 can be used. The use of the springs 75, allows for near equal sharing of the axial load between the bearings 74, eliminating the need for very precision tolerances. With two bearings, the life is extended by a factor or eight and with three, by a factor of 27. Other methods for paralleling bearing sets could also be applied.

Figure 6:
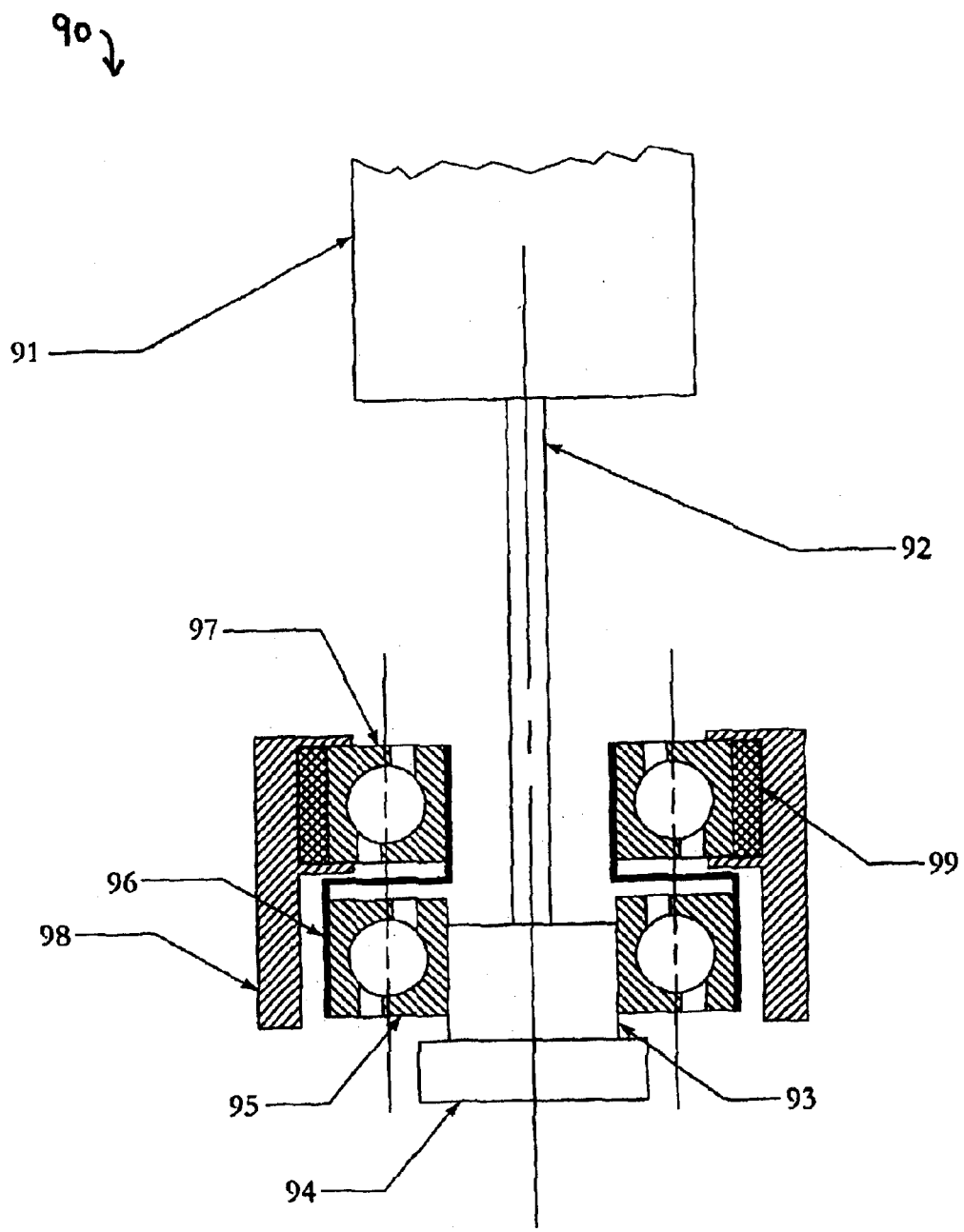
FIG. 6 is a schematic drawing of a series rolling element bearing for use with the invention.

A second method for increasing the life of the rolling element bearings is to use a series arrangement. One such mechanical bearing system 90, shown in FIG. 6, includes a quill shaft 92 that is attached to the flywheel shaft 91. On the end of the quill shaft 92 is a cylinder 93 and axial stop 94. The cylinder 93 slides axially inside the bottom bearing set 95, but transfers torque to the inner race of the bottom bearing set 95 by splines or the like. The outer diameter of the bottom bearing set 95 is attached to a connection member 96, which is also attached to the inner race of the top bearing set 97. The outer race of the top bearing set 97 is attached to the stator 98 and a damper or tolerance ring 99 can be used if desired. In this configuration, the top and bottom bearings 95, 97 both carry the full load, but split the total number of rotations between them. In theory, both bearings could rotate at ½ speed. The actual distribution of speed between the two bearing sets will vary somewhat, and when one bearing fails, the other can continue to operate, thus extending the life and adding safety. Because the life of the bearings is typically related to fatigue and not wear, the number of revolutions and load can be more important than the speed, although the two factors are related. A two bearing series arrangement only increases the life by a factor of two, where a two bearing parallel arrangement increases the life by a factor of 8. However, in designs where the speedability of the mechanical bearings is limited, such as bearings with dry lubricated cages, the series arrangement can facilitate operation.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, we contemplate the use of the invention using fewer than the complete set of noted functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof are to be considered within the spirit and scope of the invention as defined in the following claims, wherein we claim:

We claim:

1. A flywheel energy storage system, comprising:
   an energy storage flywheel supported for rotation about a substantially vertical axis on a combination bearing system using a mechanical rolling element and a first magnetic bearing;
   a motor and generator for accelerating and decelerating said flywheel for storing and retrieving energy;
   said mechanical rolling element bearing is located at only one axial end of said flywheel and provides axial and radial support for said flywheel;
   said magnetic bearing is located at an axial end of said flywheel opposite said one end thereof, and provides axial magnetic force and passive magnetic radial centering force to support said flywheel;
   said flywheel is connected to said mechanical rolling element bearing using a connecting element that imparts low radial stiffness.

2. A flywheel energy storage system as described in claim 1, wherein:
   said connecting element is a quill shaft.

3. A flywheel energy storage system as described in claim 1, wherein:
   said connecting element is a radial spring located radially disposed between said flywheel and said mechanical rolling element bearing.

4. A flywheel energy storage system as described in claim 1, further comprising:
   a second magnetic bearing located at said one axial end of said flywheel, said second passive radial magnetic bearing providing axial and radial support of said flywheel.

5. A flywheel energy storage system as described in claim 4, wherein:
   said first magnetic bearing and said second magnetic bearing provide stabile radial support, stabile tilt support and unstable axial support of said flywheel.

6. A flywheel energy storage system as described in claim 5, wherein:
   said connecting element imparts a radial stiffness that is less the radial stiffness of said second magnetic bearing.

7. A flywheel energy storage system as described in claim 6, wherein:
   said connecting element is a quill shaft.

8. A flywheel energy storage system as described in claim 6, wherein:
   said connecting element is a radial spring radially disposed between said flywheel and said mechanical rolling element bearing.

9. A flywheel energy storage system as described in claim 1, wherein:
   said flywheel is constructed primarily of steel.

10. A flywheel energy storage system as described in claim 1, wherein:
    said low radial stiffness imparted from said connecting element is less than 7000 lbs/in.

11. A flywheel energy storage system as described in claim 10, wherein:
    said mechanical rolling element bearing includes at least one ball bearing set.

12. A flywheel energy storage system as described in claim 10, wherein:
    said ball bearing set is a multiple preloaded angular contact bearing set.

13. A flywheel energy storage system as described in claim 10, wherein:
    said mechanical rolling element bearing is comprised of multiple ball bearing sets connected mechanically in series.

14. A flywheel energy storage system as described in claim 10, wherein:
    said mechanical rolling element bearing is comprised of multiple ball bearing sets connected mechanically in parallel.

15. A flywheel energy storage system as described in claim 1, wherein:
    said rolling element mechanical bearing provides a downward axial force to support said flywheel in normal operation and said magnetic bearing provides an upward force to said flywheel that is greater than the weight of said flywheel, said flywheel is substantially mechanically free to slide downward with respect to said mechanical rolling element bearing.

16. A flywheel energy storage system, comprising:

an energy storage flywheel supported for rotation about a substantially vertical axis on a combination bearing system using a rolling element bearing and a magnetic bearings;

a motor and generator for accelerating and decelerating said flywheel for storing and retrieving energy;

said mechanical rolling element bearing comprises inner and outer races and balls that rotate about said substantially vertical axis as said flywheel rotates, and said mechanical rolling element bearing is located at one axial end of said flywheel and provides axial stabilization for said flywheel;

said magnetic bearing provides stable radial centering and unstable axial support of said flywheel.

17. A flywheel energy storage system, comprising:

an energy storage flywheel supported for rotation about a substantially vertical axis on a combination bearing system comprised of a mechanical and a magnetic bearing;

a motor and generator for accelerating and decelerating said flywheel for storing and retrieving energy;

said mechanical bearing is located at one axial end of said flywheel and provides axial downward force to said flywheel;

said magnetic bearing is located at an axial end of said flywheel opposite said one end and provides axial upward force and passive magnetic radial centering force to said flywheel;

said axial upward force from said magnetic bearing is greater than the weight of said flywheel;

said flywheel slides axially downward and disengages axial support from said mechanical bearing when said flywheel system is impacted vertically.

18. A flywheel energy storage system as described in claim 17, wherein:

said mechanical bearing is a rolling element mechanical bearing and said flywheel is connected to said mechanical rolling element bearing using a connecting element that imparts low radial stiffness.

19. A flywheel energy storage system, comprising:

an energy storage flywheel having first and second axial ends, said flywheel being supported for rotation about a substantially vertical axis on a combination bearing system using a mechanical rolling element bearing at said first axial end of said flywheel, and a magnetic bearing at said second axial end of said flywheel;

a motor and generator for accelerating and decelerating said flywheel for storing and retrieving energy;

said mechanical rolling element bearing comprises inner and outer races and balls that rotate about said substantially vertical axis as said flywheel rotates, and said mechanical rolling element bearing is located at only said first axial end of said flywheel and provides radial support for said flywheel;

said flywheel is connected to said mechanical rolling element bearing using a connecting element having a low radial stiffness.

20. A flywheel energy storage system as described in claim 19 wherein: said connecting element is a quill shaft.

* * * * *